(12) United States Patent
Tarek et al.

(10) Patent No.: US 8,583,673 B2
(45) Date of Patent: Nov. 12, 2013

(54) PROGRESSIVE FILTERING OF SEARCH RESULTS

(75) Inventors: Najm Tarek, Kirkland, WA (US); Phani K Vaddadi, Issaquah, WA (US); Rajeev Prasad, Bothell, WA (US); Viswanath Vadlamani, Sammamish, WA (US); Eric Schoonover, Snohomish, WA (US)

(73) Assignee: Microsoft Corporation, Redmond, WA (US)

( * ) Notice: Subject to any disclaimer, the term of this patent is extended or adjusted under 35 U.S.C. 154(b) by 512 days.

(21) Appl. No.: 12/542,281

(22) Filed: Aug. 17, 2009

(65) Prior Publication Data

US 2011/0040776 A1 Feb. 17, 2011

(51) Int. Cl.
*G06F 17/30* (2006.01)
*G06F 7/04* (2006.01)

(52) U.S. Cl.
USPC ............................ 707/766; 707/713; 707/759

(58) Field of Classification Search
USPC ........ 707/3, 5, 102, 104.1, 999.003, 999.005, 707/999.102, 999.107, 603, 754, 759, 766, 707/768, 713; 706/45, 55, 58; 715/202, 210
See application file for complete search history.

(56) References Cited

U.S. PATENT DOCUMENTS

| | | | |
|---|---|---|---|
| 7,502,779 B2 | 3/2009 | Brockway | |
| 2006/0004717 A1 | 1/2006 | Ramarathnam et al. | |
| 2006/0026147 A1 | 2/2006 | Cone et al. | |
| 2007/0094230 A1 | 4/2007 | Subramaniam et al. | |
| 2008/0005118 A1 | 1/2008 | Shakib et al. | |
| 2008/0270359 A1 | 10/2008 | Madhavan | |
| 2009/0076839 A1 | 3/2009 | Abraham-Fuchs | |
| 2009/0100042 A1 | 4/2009 | Qiao | |
| 2009/0112841 A1 | 4/2009 | Devarakonda | |
| 2009/0204609 A1* | 8/2009 | Labrou et al. ..................... 707/5 |
| 2010/0131491 A1* | 5/2010 | Lemaire et al. ............... 707/722 |

OTHER PUBLICATIONS

Bonino, D., "Ontology Driven Semantic Search," http://www.cad.polito.it/pap/db/icai2004.pdf, (2004).
Papadakis, J., "Interactive Search Results," http://thalis.cs.unipi.gr/~jpap/interactive.pdf (2002).
Lily, http://sourceforge.net/projects/lilyontmapping/ (Oct. 10, 2008).
Agichein, E., et al., "Learning User Interaction Models for Predicting Web Search Result Preferences," http://research.microsoft.com/pubs/68153/sigir2006-fp338-preferences.pdf, (Aug. 2006).
PCT, "International Search Report and Written Opinion," PCT/US2010/044936, Aug. 10, 2010, 11 pages.

* cited by examiner

Primary Examiner — Bruce Moser
(74) Attorney, Agent, or Firm — Shook Hardy & Bacon LLP

(57) ABSTRACT

Review and filtering of search results is facilitated by providing additional types of results beyond links to existing documents can be provided in addition to or in place of links to existing documents. These additional results can facilitate modifying a search request to filter out unwanted documents. The additional results, when in the form of content display objects and/or application display objects, can also provide the user with varying levels of information detail. In some preferred embodiments, an ontology based knowledge base can be leveraged in order to facilitate providing and filtering the results.

19 Claims, 10 Drawing Sheets

PROGRESSIVE FILTERING OF SEARCH RESULTS

BACKGROUND

Searching of local or wide area networks to identify relevant resources is now a common task for many computer users. Many types of searches depend on matching keywords provided by a user with words contained in a document and/or associated with the metadata for a document. The documents corresponding to the search are then provided as a listing of links. Depending on the nature of the search query, the listing of links can contain thousands of entries. While such a listing may be comprehensive, it is often not feasible to sift through the thousands of links in a meaningful manner.

SUMMARY

In various embodiments, a system and method are provided to facilitate review and filtering of search results. In various embodiments, additional types of results beyond links to existing documents can be provided in addition to or in place of links to existing documents. These additional results can facilitate modifying a search request to filter out unwanted documents. The additional results can also provide the user with varying levels of information detail. In some preferred embodiments, an ontology based knowledge base can be leveraged in order to facilitate providing and filtering the results.

This Summary is provided to introduce a selection of concepts in a simplified form that are further described below in the Detailed Description. This Summary is not intended to identify key features or essential features of the claimed subject matter, nor is it intended to be used as an aid, in isolation, in determining the scope of the claimed subject matter.

BRIEF DESCRIPTION OF THE DRAWINGS

The invention is described in detail below with reference to the attached drawing figures, wherein.

DETAILED DESCRIPTION

Initial Display of Results

Figure 1:
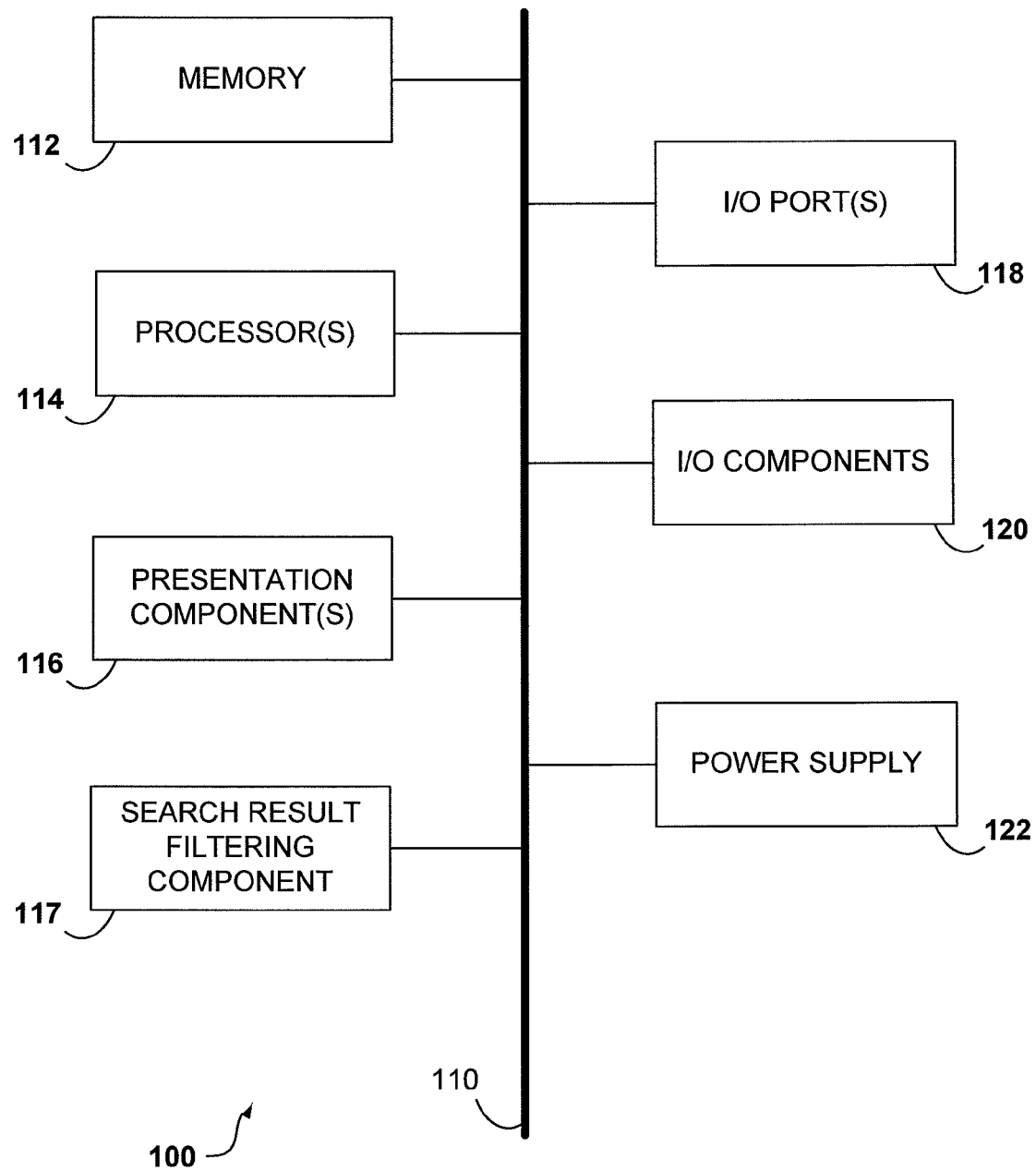
FIG. 1 is a block diagram of an exemplary computing environment suitable for use in implementing embodiments of the invention.

In an embodiment, the initial display of results can be in response to any event that results in a search query. It is not necessary for a user to explicitly provide a search query for the initial result display. For example, the initial display of results can be based on other user activity, such as selection by the user of a link for more information about a topic. The search query can then be formed based on metadata or other attributes associated with the selected link. In an embodiment where the search query is formed based on selection of a link by a user, the terms for the search query can optionally be saved as a separate field in the metadata for the link.

The initial display of results can have any convenient format. In an embodiment, the displayed results can include a plurality of content items. One type of result that can be displayed is a link to an existing document available on a network, such as a wide area network. Such links are conventionally provided by many search engines in response to submitted search queries.

While display of an existing document may provide an answer, the information desired by a user may not be located in a single document. Alternatively, it may be difficult to construct a keyword search that will identify a document with the desired information as the best match or even near the top of a results list. To overcome these difficulties, other methods and structures for providing information can be used. In various embodiments, additional information can be identified as responsive to a search request based on matching search requests to a content item based on an ontology that associates content items with concepts. Thus, rather than matching the search request to a document, such as by comparing keywords to an inverted index, the search request is matched to a content item. Examples of content items include content display objects, application display objects, and content categories.

In an embodiment, a content item can be a pre-defined object. For such pre-defined objects, a format can be provided for any information that will be displayed. The format for displaying the information can include an application for displaying the information. After matching the search request to a content item, any information needed to provide the content item can be retrieved. Since the search request is being matched to a content item, the content item does not necessarily need to exist prior to the search request. Instead, the information to be provided in the content item can be obtained when the request is received. The content item can include metadata or another description of what information should be provided. This information can then be retrieved from any convenient source, such as an information provider service, a database of information collected from previously searched Internet documents, a knowledge base, or another source. The retrieved information can then be used to populate the content item.

In some embodiments, an improved method for providing the results includes providing at least a portion of the results as content display objects. A content display object is a result object that provides a user with features beyond just raw data or a link to another location. A content display object is an object that includes both information responsive to a search query as well as a format or display methodology for presenting the information. The content display object can include multiple layers of information. For example, a content display object can allow the user to filter up to a higher level of generality and/or to a smaller amounts of information, or to filter down to get greater details and/or more information. Various types of information can be included in a single content display object, including but not limited to text, images, videos, and charts. Preferably, the content display object can also allow a user to provide annotations regarding the content display object. The content display object, including any annotations, can be saved to a personal data storage area, or another convenient data storage location. When a content display object is provided as responsive to a search query, the content display object can show some of the results, or the content display object can act as a link, with some or all of the results displayed only after selection by the user.

As an example of use of a content display object, a search query related to the current fiscal year profit for a company could be provided by a user (or formed based on other actions by a user). One type of content display object responsive to such a search query could include various levels of profit and loss information. For example, one display level could simply be a listing of the gross and net profit for the company for the current year. A second display level could provide more information, such as showing various gross and net income, profit, and expense numbers for the current year. A third display level could provide still more details for the current year, such as a line by line balance sheet of income and expenses. A fourth display level could provide a different focus, by showing various income and profit information for a time period, such as the past 5 years.

In addition to providing the above information, the content display unit could also provide a suitable format and/or application for viewing the information. In the case of providing profit information, the first and second display levels could be simple tables. The third display format, involving a detailed line by line balance sheet, could include a standard balance sheet format. The fourth display level, including the income and profit information over a time period, could include both a table and a chart showing the information.

In addition to the format for displaying the data, the content display object can also include an application for navigating the various information levels. For example, buttons labeled "next" and "previous", a scroll bar, or any other convenient interface can be provided to allow movement between the data levels. Additionally, links could be provided to access the other three display levels of information for any of the 5 years of financial history shown in the fourth level. Other types of applications could be applications for interacting with the data, such as to provide customized charts representing some portion of data, such as the 5 year history data.

As another example, a search query could be formed that information regarding a major league baseball team. A possible content display object responsive to such a query could be for the upcoming schedule of a baseball team. A first level of the content display object could provide the schedule of the team for the next month, possibly shown in a calendar style format. A second level of the content display object could provide additional information for each of the opponents on the schedule, such as won/loss information, place in the standings, and/or expected starting pitchers for the games. A third level of the content display object could show the full season schedule for the selected team. A fourth level of the content display object could provide past and future schedule information. For example, past seasons could be recapped in a schedule format, showing the schedule with notations of who won and lost each game. Any future year schedules that are available could also be included. Note that in this example of a content display unit, several applications and/or formats related to showing data in a calendar style are used. The calendars used in the various levels of the content display object can be the same, or a different calendar format can be used for each level. The information provided in the second level can also be displayed using an application and/or format that provides the information in a convenient manner for display. The applications and/or formats can be used because the type of information to be displayed in a given content display object is known ahead of time, even though the information itself may be accessed or otherwise obtained after the request is made.

In other embodiments, an improved method for providing results includes providing at least a portion of the results as application display objects. An application display object is a result object that provides an application identified as relevant to search query. When provided as part of an application display object, the application can be further customized based on the context of the search query. For example, a search query may ask for stock information related to a Company A. A matching application display object could provide a stock screening tool, with one or more fields of the screening tool already populated in order to select Company A.

Another example of an application display object could be a statistical analysis tool for a major league baseball team, in response to a query asking for statistics about a team. The application display object could be provided with the desired team's name pre-populated in a field for the team that is to be analyzed. Using the tool, the past performance data for a team could be used to make various predictions about the team, such as what their projected win/loss ratio will be based on their current statistics. The tool could also allow for projection of the best lineup for the team, based on the statistical profile of the individual players over a selected time period.

Still another example of an application display object could be a recipe conversion tool in response to a search query about an ingredient that is difficult to obtain. The recipe conversion tool would be pre-populated with the ingredient, if any, mentioned in the search query. Entry fields would also be available for the amount of the ingredient to use. The conversion tool would then display one or more substitute ingredients, along with the correct amount to use based on the required amount of the unavailable ingredient.

In still other embodiments, an improved search method is provided to allow intuitive filtering and shifting of subject matter during search. An initial search result of content items can be provided that includes content display objects responsive to the search query, application display objects responsive to the search query, and content categories. With regard to the content categories, at least one content category can be directly responsive to the search query. Such a content category can be referred to as a primary content category. Additional content categories can also be provided based on a relationship to the responsive content category. Such content categories can be referred to as secondary content categories. Optionally, more than one primary content category can be displayed based on the search query, with secondary content categories being provided that are associated with each of the primary content categories. The secondary content categories may optionally be selected based on context, such as context from the search query. Alternatively, context can be provided based on content categories recently viewed by a user, even though terms from the recently viewed categories are not explicitly part of the search query.

One example of a method for displaying content categories is by providing a graph navigation display. In a graph navigation display, the content categories can be displayed as nodes, with lines between nodes indicating relationships between content categories. The lines between the nodes can be based on two content categories having a relationship that satisfies a threshold. Alternatively, more than one type of line may be used to connect nodes, to indicate different types of relationships. For example, lines of various weights, colors, or dashes could be used to indicate different types of category relationships.

In such a graph display of content categories, the one or more primary content categories can be shown as a type of central point in a graph navigation display. Other content categories will radiate outward from the primary content categories. Even though each primary content category will be responsive to a search query, there may or may not be a line showing a relationship between multiple primary content categories.

In an embodiment involving a graph display of content categories, a user can choose to modify a search query by selecting one of the nodes displayed in the graph. Depending on the nature of the selection, the search query can be modified to add all terms associated with the selected graph node, or modified to replace the search query with the terms associated with the node. Alternatively, selection of a graph node can leave the search query unchanged. In some embodiments, the content category graph can be represented in a display multiple times, so that selection of a node in one display area will not modify the search query, while selection in another display area will lead to modification of the search query. When the search query is modified based on selection of a node, a new content category graph with a new primary content category (or primary content categories) can be displayed. Any other object displayed as responsive to a search query can also be modified.

Note that in some embodiments, the content display objects and application display objects may not have any search terms directly associated with the display objects. Instead, the content display objects and application display objects can be associated with one or more content categories. The search terms associated with the content category would then be used for the display objects. In still another embodiment, a content category could include multiple metadata entries, so that different groups of search terms could lead to a match for the content category. However, each of the different groups of search terms could have a varying degree of association with one or more content display objects and/or application display objects. In such an embodiment, multiple different search queries could result in a match with a particular content category as a primary content category while displaying different content display units and/or application display units.

Matching Search Queries with Results

Various methods can be used for matching a search query to a document from a wide area network. For matching of existing documents, conventional search query techniques can be used. Any convenient method can also be used for matching the content items according to the invention. A simple scheme for matching content items could be to assign one or more keywords to each type of content item. For example, for a content item related to financial information for Company A, the terms "financial results" and "Company A" can be assigned to the content item. Of course, more complicated systems for providing matches to content items can also be used. An example of an ontology based knowledge web that can be used both for matching search queries and for providing information for content display objects will be provided later.

Progressive Filtering of Search Results

After displaying the initial search result, the search query can be modified based on user selection of one or more of the displayed content items, including the content display objects, application display objects, and content categories. In an embodiment, some or all of the content items can be associated with one or more terms that can be added to a search query. When a content item is selected, the search query can be modified to add some or all of the terms associated with the content item. Optionally, the search query can be further modified to remove one or more terms when a content item is selected. Alternatively, selection of a content item does not have to lead to modification of the search query.

Regardless of how a search query is obtained, an initial display of content items is provided based on the search query. The search results can then be progressively filtered based on user selections of the displayed results. In various embodiments, the search query can be modified based on a user selection of a content item to add terms, remove terms, or both add and remove terms.

In an embodiment, user selection of a content item can indicate a preference for modifying a search query. Each content item can optionally have one or more search terms that are associated with the content item. The search terms associated with a content item can be associated with the content item by any convenient method, such as by inclusion of the search terms as part of metadata for the content item. When a user selects a content item, some or all of the search terms associated with the content item can be added to the search query. In embodiments where search terms are added to a search query based on selection of a content item, the interface displaying the content items to the user can be updated to reflect the new search query. Thus, based on the selection of a content item, a user can potentially receive information directly related to the selected content item, and can further potentially receive a new display of content items that match the modified search query.

In another embodiment, selection of a content item can also lead to removal of one or more terms from a search query. For example, the content item selected by a user can represent a desire by the user to shift the focus of the search query to a broader or higher level of abstraction. This desire to broaden the search could be based on the search terms associated with the content item, as the search terms associated with the content item may be a subset of the search terms currently in the search query. In such an example, the search query could be modified by having terms removed, with no terms added. Alternatively, the content item selection could indicate a lateral change in focus, so that terms are both added and removed. In an embodiment, this could occur by presenting the user with an interface showing all of the terms that could be included in the search query, and waiting for a user selection. In another embodiment, this can be automatically done by replacing the search query with the terms associated with the selected content item.

In an embodiment, the type of modification of the search query that occurs based on content item selection can vary based on the location of the selected item in the display. For example, the display of results that is provided to a user can have several display areas. In various embodiments, one or more of the following types of display areas may optionally be used as part of the results display. One of the display areas can correspond to content items that do not modify a search query on selection. Another display area can have content items that can add search terms upon selection, but not remove search terms. Still another display area can have content items that can add and remove terms upon selection, such as by replacing the existing search query terms with the terms associated with the content item. Yet another display area can have content items that prompt a user for how to modify a search query when the content item is selected.

Interface with Knowledge Base

In various embodiments, display of content items and progressive filtering is facilitated by interfacing a system according to the invention with one or more types of data stores or other systems. One type of system and/or data store that can be accessed is a system and/or data store that stores and maintains the concepts and categories associated with the content items. For example, a system that stores and maintains an ontology of terms can be used as the source for the content categories, content display objects, and application display objects that will be displayed.

In another example, the system and/or data store for maintaining the ontology can be different from the system and/or data store that contains information associated with each concept or category in the ontology. For example, the ontology can be maintained so that the concepts and categories are known, along with the relationship between concepts and the types of information that should be available within a content display object, application display object, and/or content category. The information itself, however, can be retrieved as needed from other systems or services.

As an example, a concept within an ontology could be "Financial information for companies." One category within this concept could be "Financial information for Company A", while another category could be "Applications for comparing financial performance." Still another category could be "Financial information for companies within an industry group." Note that there can be multiple categories at a similar level, such as multiple "Financial information for companies within an industry group" to represent the various industry groups. Note also that some categories can optionally be sub-categories of other categories. Thus, "Financial Information for Company A" could be a sub-category under a category of "Financial information for companies within an industry group."

Having briefly described an overview of various embodiments of the invention, an exemplary operating environment suitable for performing the invention is now described. Referring to the drawings in general, and initially to FIG. 1 in particular, an exemplary operating environment for implementing embodiments of the present invention is shown and designated generally as computing device 100. Computing device 100 is but one example of a suitable computing environment and is not intended to suggest any limitation as to the scope of use or functionality of the invention. Neither should the computing device 100 be interpreted as having any dependency or requirement relating to any one or combination of components illustrated.

Embodiments of the invention may be described in the general context of computer code or machine-usable instructions, including computer-executable instructions such as program modules, being executed by a computer or other machine, such as a personal data assistant or other handheld device. Generally, program modules, including routines, programs, objects, components, data structures, etc., refer to code that perform particular tasks or implement particular abstract data types. The invention may be practiced in a variety of system configurations, including hand-held devices, consumer electronics, general-purpose computers, more specialty computing devices, and the like. The invention may also be practiced in distributed computing environments where tasks are performed by remote-processing devices that are linked through a communications network.

With continued reference to FIG. 1, computing device 100 includes a bus 110 that directly or indirectly couples the following devices: memory 112, one or more processors 114, one or more presentation components 116, input/output (I/O) ports 118, I/O components 120, and an illustrative power supply 122. FIG. 1 further shows a search result filtering component 117 according to an embodiment of the invention. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be grey and fuzzy. For example, one may consider a presentation component such as a display device to be an I/O component. Additionally, many processors have memory. The inventors hereof recognize that such is the nature of the art, and reiterate that the diagram of FIG. 1 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 1 and reference to "computing device."

The computing device 100 typically includes a variety of computer-readable media. Computer-readable media can be any available media that can be accessed by computing device 100 and includes both volatile and nonvolatile media, removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, Random Access Memory (RAM), Read Only Memory (ROM), Electronically Erasable Programmable Read Only Memory (EEPROM), flash memory or other memory technology, CD-ROM, digital versatile disks (DVD) or other holographic memory, magnetic cassettes, magnetic tape, magnetic disk storage or other magnetic storage devices, carrier wave, or any other medium that can be used to encode desired information and which can be accessed by the computing device 100. In another embodiment, the computer storage media can be a tangible computer storage media.

The memory 112 includes computer-storage media in the form of volatile and/or nonvolatile memory. The memory may be removable, non-removable, or a combination thereof. Exemplary hardware devices include solid-state memory, hard drives, optical-disc drives, etc. The computing device 100 includes one or more processors that read data from various entities such as the memory 112 or the I/O components 120. The presentation component(s) 116 present data indications to a user or other device. Exemplary presentation components include a display device, speaker, printing component, vibrating component, and the like.

The I/O ports 118 allow the computing device 100 to be logically coupled to other devices including the I/O components 120, some of which may be built in. Illustrative components include a microphone, joystick, game pad, satellite dish, scanner, printer, wireless device, etc.

Figure 2:
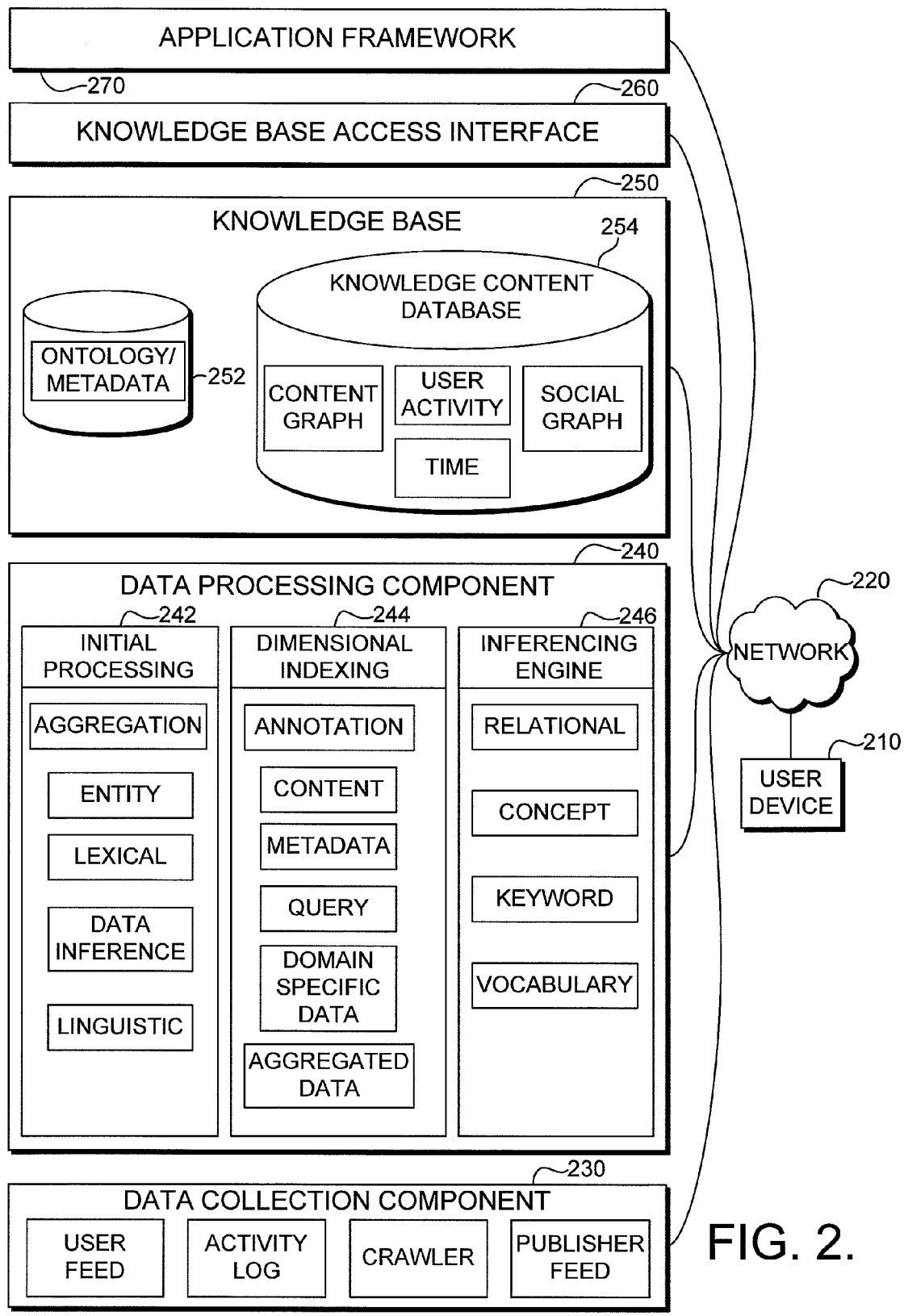
FIG. 2 schematically shows a knowledge database suitable for use in conjunction with some embodiments of the invention.

With reference now to FIG. 2, a schematic diagram is illustrated showing an exemplary system architecture 200 suitable for use in generating knowledge content and providing such content to a user in response to receiving an information request, in accordance with an embodiment of the present invention. The system architecture 200 includes a user device 210, a data collection component 230, a data processing component 240, a knowledge base 250, a knowledge base access interface 260, and an application framework 270, all in communication with one another through a network 220.

The network 220 may be wired, wireless, or both. The network 220 may include multiple networks, or a network of networks, but is shown in FIG. 2 in more simple form so as not to obscure other aspects of the present invention. For example, the network 220 may include one or more wide area networks (WANs), one or more local area networks (LANs), one or more public networks, such as the Internet, and/or one or more private networks. In a wireless telecommunications network, components such as a base station, a communications tower, or even access points (as well as other components) may provide wireless connectivity in some embodiments. Although single components are illustrated for the sake of clarity, one skilled in the art will appreciate that the network 220 may enable communication between any numbers of user devices. Networking environments are commonplace in offices, enterprise-wide computer networks, intranets, and the Internet. Accordingly, the network 220 is not further described herein.

The user device 210 may be any computing device that is capable of web accessibility, for instance, the computing device 100 of FIG. 1. As such, the user device 210 might take on a variety of forms, such as a personal computer (PC), a laptop computer, a mobile phone, a personal digital assistance (PDA), a server, a CD player, a MP3 player, a video player, a handheld communications device, a workstation, any combination of these delineated devices, or any other device that is capable of web accessibility. In one embodiment, the user device 210 is a mobile device that utilizes a wireless telecommunications network to communicate. A mobile device may include, for example, a display(s), a power source(s) (e.g., a battery), a data store(s), a speaker(s), memory, a buffer(s), and the like.

The data collection component 230, the data processing component 240, the knowledge base 250, the knowledge base access interface 260 and the application framework 270 may reside in association with one or more computing devices, e.g., a server or collection of servers configured for accessing and collecting data and providing responses to received queries. It will be understood that, though components 230, 240, 250, 260 and 270 are illustrated as distinct components, one or more of the illustrated components 230, 240, 250, 260 and 270 may, in fact, be combined or may itself be comprised of multiple components. The illustrated system architecture 200 is but one exemplary configuration and is not intended to be so limiting.

The data collection component 230 is configured for obtaining input data for the system architecture 200. In embodiments, information may be obtained in a number of ways, including through the use of a user feed, an activity log, a web crawler, and a publisher feed. An example of a user feed is the entering of user information into a user profile. Another example of a user feed is the input of user preferences into a knowledge store. An additional exemplary user feed may include any other information that is input by a user at an input device, including but not limited to, a publisher feed. Using a publisher feed, publishers may submit structured, semi-structured and/or unstructured content to the data collection component for interpretation and analysis.

Similar to the user feed as a source of data, an activity log of one or more users also may be a source of data input into the system architecture 200. In addition to tracking the web activity of one or more users, the activity log may also be used to track the periodic updating cycles of websites or other indicia that are available from tracking activity occurring on a website.

Another way of gathering information is pulling data from the crawling of web documents. The manner and type of crawler may depend on user preferences, efficiency limitations, and/or the preferences of programmers inputting crawler limitations. It will be understood that other embodiments of crawler characterizations are within the scope of embodiments of the present invention, as well. Alternatively, or in addition, information may be obtained for the system 200 from other sources (e.g., may be pushed into the system). Data pushes may originate from one or more sources, such as structured data sources. For example, data may be updated to the system architecture 200 through periodic data feeds to systems from a company, or from site updates received from publishers as part of their publishing cycle. Data pushes may also originate from a community of contributors, wherein a user may upload personal data or documents.

Data received from one or more sources, such as those listed above, are analyzed by the data processing component 240 to extract relevant information. That is, the data processing component 240 is configured for analyzing obtained input data and extracting information there from. In embodiments, once data is received by the data collection component 230, the collected data may be processed by one or more data processing sub-components of the data processing component 240. The data processing component 240 illustrated in FIG. 2 includes an initial processing sub-component 242, a dimensional indexing sub-component 244 and an indexing engine 246 for processing collected or received data.

In embodiments, the initial processing component 242 is configured to analyze data and extract information using one or more data processing methods. In this regard, the initial processing component 242 may be used to analyze data and extract information from the three types of data described herein above: unstructured data, structured data, and semi-structured data. Unstructured data may comprise documents possessing a series of text lines. Documents that are included in the category of unstructured data may have little or no metadata. Structured data, on the other hand, may comprise a traditional database where information is structured and referenced. Semi-structured data may comprise a document such as a research paper or a Security and Exchange Commission filing, where part of the document comprises lines of text and part of the document comprises tables and graphs used for illustration. In the case of semi-structured data, the structured components of a document may be analyzed as structured data and the unstructured components of the documents may be analyzed as unstructured data.

Such data processing method(s) (e.g., a series of analytical components data may pass through) for processing data may be open and extensible. In this way, as an example only, one or more developers and communities may plug in new data extraction processes, entity detection methods, and classification analysis programs to enhance the quality and categories of information extracted from collected data. In embodiments, initial processing of data by the initial processing component 242 may include one or more of a lexical analysis, a linguistic analysis, and an entity extraction analysis. At or after an initial analysis, inferences may be made between aspects of the data received. As such, data from seemingly disparate sources may be integrated and new relationships may be inferred through the extraction of attributes, such as meaning and semantics, from the data. Inferences may be created through entity relationship extraction using documents being processed and data which is already stored in the knowledge base 250. Attribute extraction and inferences are more fully described below.

In embodiments, inferences may be formed as data is loaded into the system architecture 200. Such inferences may be discerned between new information and information that is already stored in the system architecture 200, for instance, in association with the knowledge base 250 (as more fully described below). In further embodiments, data stored in the system architecture 200 may be analyzed for inferences when new entries have been entered into the system architecture 200, particularly when new entries are added to the knowledge base 250 of the system architecture 200. As such, the system architecture 200 may be thought of as a learning system. Once inferences have been made from the data extracted, those inferences may be aggregated into a new data store, such as a knowledge content database 254 of the knowledge base 250.

In embodiments, the dimensional indexing sub-component 244 creates a multi-dimensional index or table that references components of the knowledge base 250. In embodiments, the dimensional indexing sub-component 244 is also responsible for abstracting data based on relational schema and ontology and unifying the data such that it may be exposed as a knowledge graph. Ontology may reside in the knowledge base 250. As such, the dimensional indexing sub-component may refer to ontology stored in the knowledge content database 254. The dimensional indexing sub-component 244 thus enables the mapping of the data and the ontology. Additionally, the dimensional indexing sub-component 244 enables the mapping of sub-areas such as metadata, content, annotation, query, domain-specific data and aggregated data. The dimensional indexing sub-component 244 enables the mapping of data and ontology through the use of objects and attributes, respectively. The graphs used in the system architecture 200 are constructed based on a flexible, extensible data storage schema, for instance, a star or snowflake schema. The star or snowflake schema is used to map objects. As such, the dimensional indexing sub-component governs when and how connections or relationships stored in association with the flexible star schema are generated, modified and/or broken. In embodiments, the dimensional indexing sub-component may also, or alternatively, index data based on keywords, vocabulary and/or concepts related to each data element and/or object.

Objects may represent a concept within a web document, or an object may represent a character in a play. Additionally or alternatively, an object may represent a mathematical theorem or a geographical location. Each object is associated with at least one reference, such as a web document. For the examples used above, a reference associated with a concept within a web document may be the web document itself; a reference associated with a character in a play may be the text of the play itself; a reference associated with the mathematical theorem may be a document chronicling the history of the mathematical theorem; and a reference associated with a geographical location may be a map of the location and/or a website associated with that geographic location (e.g., a website associated with the state of Missouri).

In addition to being associated with at least one reference, each object comprises at least one attribute. In embodiments, an attribute comprises a characteristic or a fact or data associated with an object. In the examples above, attributes associated with a concept in the web document may include a common definition of the concept, the number of people who have searched for that concept and selected that web document, or names of writers who have written on that concept (if any). Exemplary attributes associated with a character in a play may include the character's love interest (if any), the geographical origin of the character (if known), the author of the play, or generally agreed upon traits of the character. Exemplary attributes associated with a mathematical theorem may include the name of the person(s) who discovered the theorem, the date the theorem was discovered, and historical facts relating to the development and/or acceptance of the theorem. Exemplary attributes associated with a geographic location may include the history of the region, the language(s) commonly spoken in the region, and the longitudinal and latitudinal reference points of the geographic location.

The inferencing engine 246 is configured for making second degree inferences by analyzing inferences that may exist between data that is added to the knowledge base 250 and inferences that have been stored in the knowledge base 250 of the system architecture 200. As such, one aspect of the inferencing engine 246 may be to analyze the knowledge base 250 to search for new inferences that may be made when data is added to the knowledge base 250. In alternative embodiments, the inferencing engine 246 may search for new inferences in response to the receipt of an information request. The illustrated knowledge base 250 includes an ontologies/metadata component 252 and a knowledge content database 254. Though illustrated as a single database, it will be understood by those of ordinary skill in the art that the knowledge content database 254 may, in fact, be a collection of one or more databases, one or more of which may be stored in association with a server (not shown), network (not shown), other system components (e.g., user device 210), or other computing devices (not shown).

The illustrated knowledge content database 254 includes a content graph, a user activity graph and a social graph, as well as temporal data as it relates to each of the content graph, the user activity graph and the social graph. In embodiments, the user activity data graph may be constructed from information associated with user activity, for instance, the activity of registered users. User activity may include, by way of example only, user inputs, the number and types of page views, query activities, and annotation activities (for instance, where a user initiates an action that indicates a website is trustworthy). In embodiments, a user may be verified as being a registered user through the use of a security measure, such as a password or another form of authenticating the identity of the user, such as through the originating address of a user device (e.g., user device 210).

In embodiments, the social graph of the knowledge content database 254 includes objects associated with data relating to a user profile(s), user relationships with other users, and user preferences. In further embodiments, the social graph may include user profile information associated with participants of a social network. For example, a social graph may include all "friend" listings in an area, or it may include information relating to which users are friends of a user's friends ("friend of a friend" data). Data associated with users on a social networking website may include user demographic information, user psychographic information and user behavioral data.

In embodiments, the content graph of the knowledge content database 254 may include one or more attributes of entities, attributes comprising keywords, metadata, meanings, associations, properties, content, query, query results, annotation, and semantified data entities. Keywords entered into a query may be used to determine a best match within the knowledge base that corresponds best with the intended meaning behind the query. To do this, documents and queries are analyzed to discern the entities, relationships and facts contained in the documents. For example, a keyword phrase "President of the United States" may be understood as referencing knowledge related to a position of political office, but it may also be understood as referencing knowledge related to the country of the United States of America. Additionally, the keyword phrase may reference a series of time periods associated with past presidents, and/or it may reference a time period (e.g., 4 years) that comprises one term of a presidency. In order to present these relationships to the user, the keyword query may be translated to a query graph. The query graph may be a sub-graph that matches against a series of graphs in the knowledge database. The query graph may be presented to the user in response to a keyword query. The query graph may contain the type of references described above, and may be accessed using a pivot table functionality.

In embodiments, a keyword entity may comprise keywords and phrases that are indexed and managed by the indexing components of a core subsystem. Additionally, a metadata entity may comprise a set of data initialized by a system from known sources and enhanced by intelligent algorithms and collaborative annotation. Metadata may be managed by a metadata management component of a core subsystem.

A content entity may comprise information about content, as well as the content itself. The data collection component 230 and the data processing component 240 may analyze this content and store it in the system architecture 200, for instance, in association with the knowledge base 250. Information requests and responses to information requests may comprise data stored and processed in the same or a similar manner as other, unstructured contents. Extracted semantics may be used in various functionalities such as personalization of a knowledge content experience to an individual user. Recent responses to information requests may also be stored to enhance search performance and relevance. This data may be managed and used by a data presentation and enhancement component (not shown).

The knowledge content database 254 may further include an annotation component (not shown) having an ontology/metadata management component configured for managing metadata annotation. The knowledge database may additionally include a semantified data component (not shown) configured for storing semantified data in relational tables or in graph tables. Semantified data may be managed by the dimensional indexing sub-component 244 and/or other relational database managers (not shown).

The temporal data of the knowledge database 254 may comprise information related to the temporal nature (that is, of or related to time) of data included in other graphs. A time index may comprise an aggregation of time elements. For instance, a user may query how many minutes he has spent on the computer in the past thirty days. The time element may track each user activity entry related to the past 30 days, and may sum up the times related to deliver a final sum to the user in response to the user query. The time aspect may also be used to interpret aspects of a user query. For instance, a user may query: "Who was president of the United States when I was in college?" The data processing component 240 may access the social graph to determine user information entries related to when the user was at college, and then the data processing component 240 may access the temporal data to determine what time period the user was in college. This information may then be used to access the content graph and determine who was president during the given time period determined by reference to the temporal data of the knowledge database.

The ontology/metadata component 252 of the knowledge base 250 may serve as an ontology- and metadata-based index that is used to graph objects associated with graphical components of the knowledge content database 254. The objects may be extracted from the graphs comprising the knowledge content database 254, such as the content graph, the social graph, the user activity graph, and the temporal data. In embodiments, the ontology/metadata component 252 is enabled through the dimensional indexing sub-component 244 and is modified through the inferencing engine 246.

In embodiments, the ontology/metadata component 252 references data from each graph using a common referencing schema. The common referencing schema may be in the form of a flexible, extensible star schema. Through the use of a star schema, a set of data may be stored in a data table. From this initial data table, additional data may be referenced by snow flaking into other tables. For instance, a data table comprising a list of users who have visited a particular website may have data tables snow-flaked from each user comprising a list of websites that each user has viewed within a certain period of time. In this way, the snow-flaked tables may be considered dimensions of the original data table. While dimensions may be within the same type of data category, such as user activity, dimensions may also serve as a bridge connecting data across different types of data categories. For instance, in the example given above, a data table comprising an individual list of websites visited by a user may have a dimension of websites that have been identified by the individual as being a "favorite" website. This dimension may then lead to a data table of user preferences for the individual, which may then lead to a social profile of the individual. Through the dimensions listed in this embodiment, information about a website may lead to the preferences of an individual. As such, the use of the common referencing schema allows objects to reference disparate aspects of data collected for the knowledge content database 254 and stored in different graphs.

As described above, one way to navigate through a flexible star referencing schema is through the use of pivoting through data tables and dimensions of data tables. Through the use of this type of pivoting, a user and/or an application may navigate through a large amount of information collected from web content information, user activity information, social networking activity information, etc. The use of pivoting is distinct from the concept of drilling down, because the use of a pivot between data tables allows information to be drilled down as well as to be drilled up, so to speak, as information from a dimension may expand beyond an initial data table.

One example that may be used to distinguish the use of a pivot table over a general search engine includes the way in which a search query is interpreted using the system architecture 200. Similar to prior methods of searching, a user may input a search query comprising one or more keywords. In prior methods, the search query is then matched against a set of documents on an inverted index. In embodiments of the present invention, the inverted index may be replaced by a more powerful "pivot table" to pivot around large numbers of objects. In contrast to a search results ranking, the relationship between objects on the knowledge graph may be increased if it is determined that those relationships are tied to the search query. The user may then be presented with results to his or her search query.

Information stored in association with the knowledge base 250, wherein access is provided to each of the content graph, the user activity graph, the social graph and the temporal data, information associated with such graphs being organized and indexed in accordance with the ontology/metadata component 252, may be referred to herein as "knowledge content." Such "knowledge content" is derived from formerly discrete content silos through a common, referencing data storage schema, with the application of one or more ontologies and pivot table functionality, such that the content is smarter and more comprehensive than content offered by prior art query-receiving and answering systems.

The knowledge base access interface 260 of the system architecture 200 may allow a user to access components of the knowledge base 250. Once the knowledge base 250 has been constructed, users may interact with the knowledge base access interface 260 through applications hosted on the application framework 270. The application framework 270 may allow users to access and query the knowledge base 250 by submitting information requests that are processed by the data processing component 240. Additionally, APIs may be used to allow developers to write applications that utilize the knowledge base 250. The new applications may then be used by users. In embodiments, users may use applications such as open APIs to access data in the illustrated system architecture 200.

In an exemplary embodiment of user interaction with the illustrated system architecture 200, the ontology/metadata component 252 may include a series of fifty objects representing each state of the United States of America (U.S.A.), where each object may have a common link to a separate object representing "U.S.A." In this example, a user may generate an inquiry as to the number of states in the U.S.A. that were east of the user's location in 1814. The inquiry may be generated, for instance, at user device 210. The user query may be received by the data processing component 240, where the query may be processed by the dimensional indexing sub-component 244. The user inquiry may be analyzed against the knowledge base 250 to access the user's social graph to determine the user's location. The knowledge base 250 may also be used analyze the inquiry based on ontology (using ontology/metadata component 252) to determine the user is requesting states that are entirely east of the user's location, e.g., states that are partially east and partially west would not count. The knowledge base 250 may then be used to analyze a content graph to determine a list of states that meet the criteria of the inquiry, with the knowledge graph referencing the temporal data of states as they were defined in 1814. The dimensional indexing sub-component 244 may identify an entry on the ontology/metadata component 252 that answers the user query. In response, the user may be returned with a list of states that were east of the user's location as of the year 1814. The response may also include pivots comprising information related to the states. For example, the pivots may include histories of the states (based on the user's inquiry being based in 1814), the governor of the states in 1814, and present-day directions of how to travel to each state.

In another embodiment, a user may request a listing of all states in the U.S.A., in which case the knowledge database may be analyzed to generate a responsive listing to the user query. In response, the user may be returned with a data table containing a list of the names of all fifty objects referring to the fifty states. Alternatively, the user may request only the states beginning with the letter "A." In response, again analyzing the knowledge base 250, the user may be returned with a listing of the objects possessing both an attribute of being a state in the U.S.A., as well as an attribute of: "Name starts with A."

Those skilled in the art will appreciate that embodiments of the present invention contemplate the presence of additional components and/or sub-components of the system architecture 200, and the components and/or sub-components may be combined with one another and/or separated into new components and/or sub-components.

Figure 3:
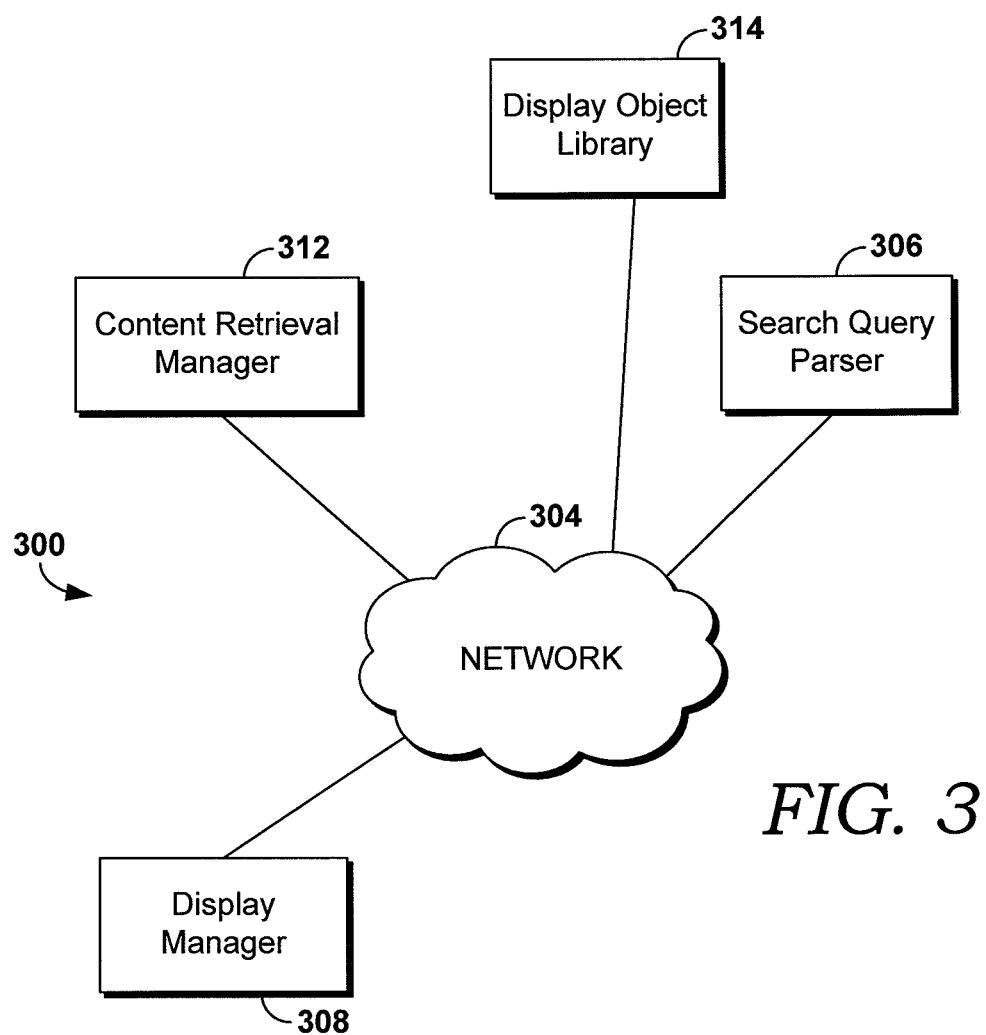
FIG. 3 schematically shows a system according to an embodiment of the invention.

FIG. 3 schematically shows an example of a system for providing and filtering search results suitable for performing various embodiments of the invention. The embodiment shown in FIG. 3 includes a content retrieval manager 312 capable of retrieving information for display in a content display object and identifying a format for information in the content display object. In the embodiment shown in FIG. 3, when it is determined that a content display object is responsive to a search query, content retrieval manager 312 determines the information needed to populate the content display object. The content retrieval manager can then query one or more information sources in order to obtain the needed information. The knowledge base system shown in FIG. 2 is an example of an information source suitable for providing this information. In the embodiment shown in FIG. 3, display objects are selected for display based on search query parser 306 and display object library 314. Search query parser 306 evaluates the search query to determine the search terms and/or any context associated with a query. Based on the query, the display object library 314 can be consulted to identify the content items that provide the best match to the query. The content items can then be displayed in an appropriate format by display manager 308. In FIG. 3, these various components are shown as interacting via a network, which could be a local area network or a wide area network. Alternatively, some or all of the various components could be co-located on a single computing device.

Figure 4:
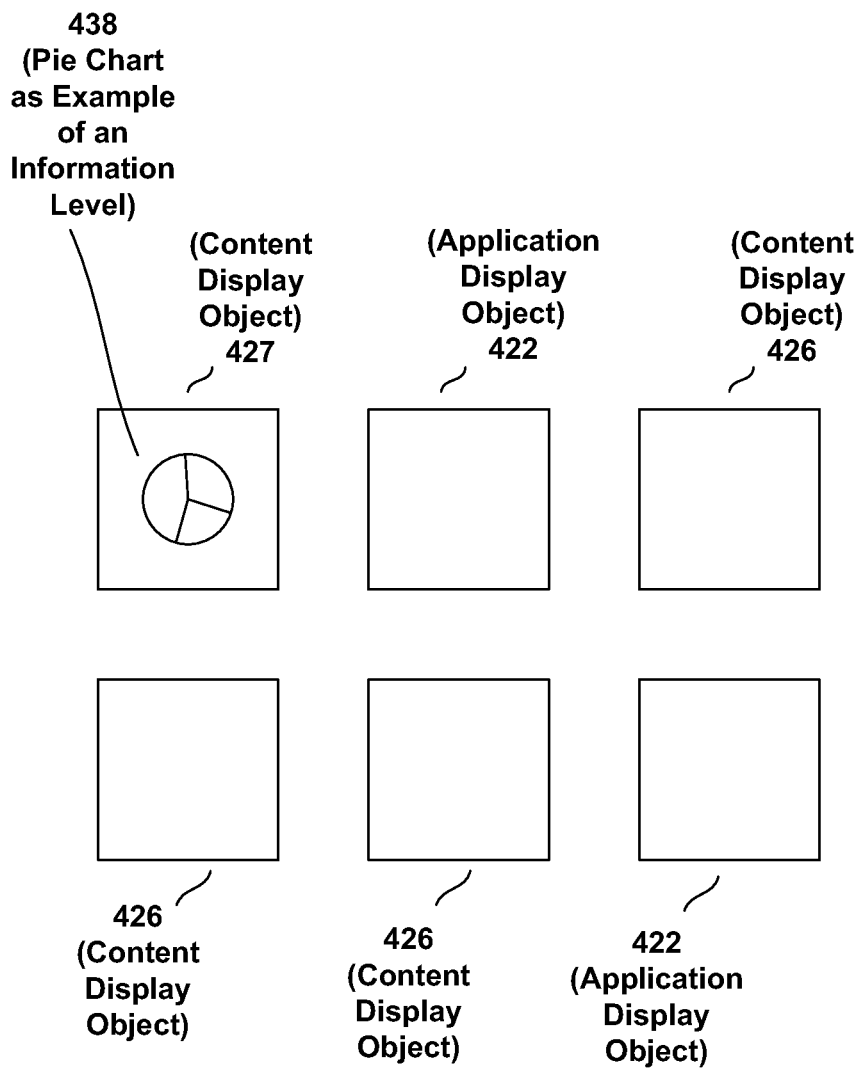
FIG. 4 schematically shows a display of results produced according to an embodiment of the invention.

FIG. 4 shows an example of a results display for a plurality of display objects responsive to a search query. The example in FIG. 4 represents one possible way of providing results to a user in response to a search query. The display objects shown in FIG. 4 are a combination of application display objects 422 and content display objects 426 and 427. In other embodiments, any other combination of display objects can be provided, including having only application display objects 422 or only content display objects 426 and 427. In FIG. 4, a total of six display objects are shown as a results listing. In other embodiments, any convenient number of display objects can be provided as part of a results display. The display objects can be arranged in as many rows, columns, or other configurations as are desirable. Optionally, additional display objects can be made available by having scroll bars, "next" buttons, or any other convenient method for allowing movement of objects into and out of a display area.

In the display area, the application display objects 422 and content display objects 426 can simply be icons that provide a link to the desired information. Alternatively, the display objects can show a portion of the information and/or application contained within the display object. In FIG. 4, content display object 427 includes a depiction of one of the information levels 428 included in the content display object.

Figure 5:
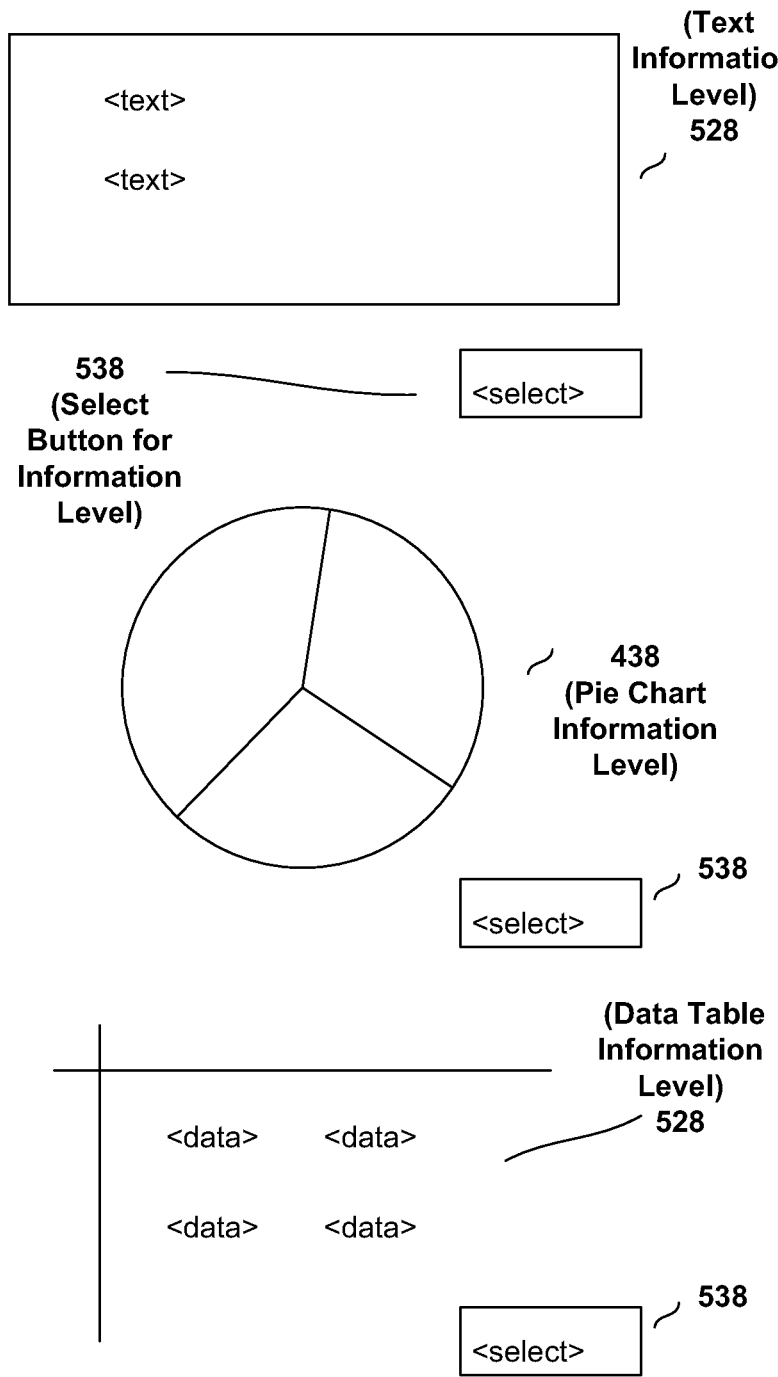
FIG. 5 schematically shows a display of results produced according to an embodiment of the invention.

When content display object 427 is selected, the additional information levels in the content display object can be provided to a user. FIG. 5 shows an example of multiple information levels displayed after selecting a content display object 427. In the embodiment shown in FIG. 5, each information level is schematically represented by a different information type. Thus, one information level 438 is schematically represented by the pie chart that was shown in the results display page from FIG. 4. Other information levels are represented by text 528 and table 529 that contains data. The use of different information formats for each information level is for convenience of explanation only. In other embodiments, multiple information formats can be included within each information level. In still other embodiments, different information levels can use similar information formats.

In FIG. 5, each information level includes an optional "select" button 538. The optional select button schematically represents the ability to select a particular information level for use in modifying the search query. In embodiments where an information level can be selected for use in modifying a search query, each information level can have one or more search terms associated with it. When an information level is selected, the search query is modified. When a user then views the main results page showing the multiple display objects, the page will show a revised group of display objects corresponding to the modified search query.

Figure 6:
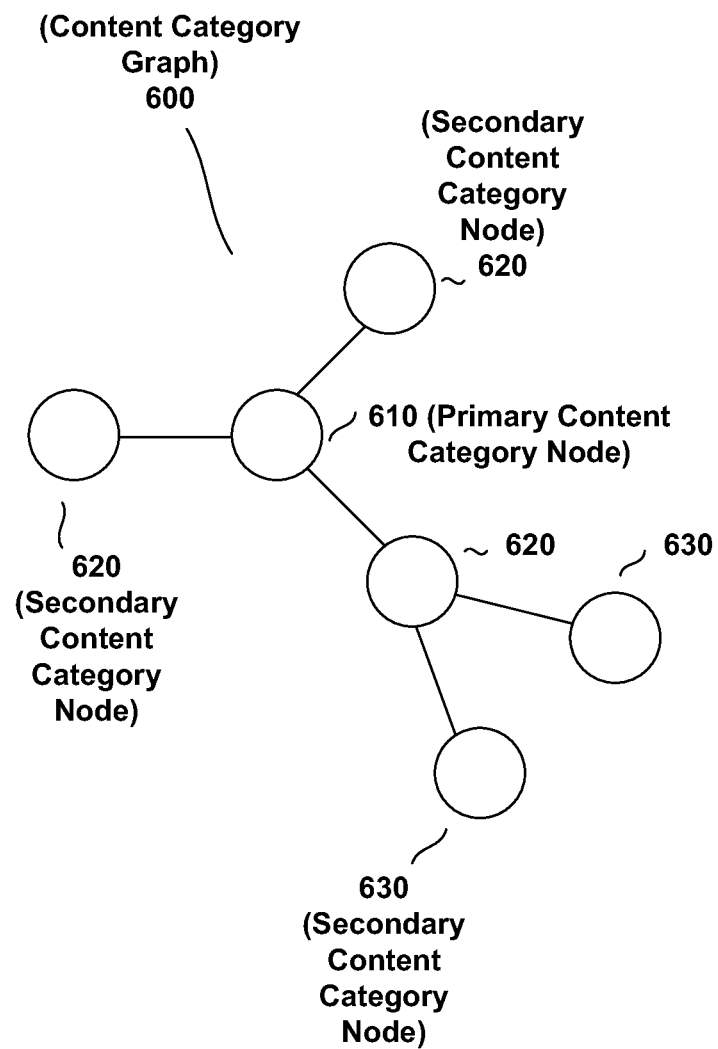
FIG. 6 schematically shows a display of results produced according to an embodiment of the invention.

FIG. 6 depicts an example of a content category graph 600. A content category graph is one option for displaying content categories that are responsive to a search query. In FIG. 6, the content category graph includes one primary content category 610. The primary content category 610 represents a content category that is considered as a match to a search query. In some embodiments, more than one primary content category 610 can be displayed in response to a search query. FIG. 6 also shows a number of secondary content categories 620 and 630. Secondary content categories are selected based in part on the relationship of the secondary content category to another content category. In FIG. 6, secondary content categories 620 are considered nearest neighbors to primary content category 610 in the content category graph. Secondary content categories 630 are nearest neighbors to one of the secondary content categories 620. As an example, consider a search query that results in the company "Microsoft" matching the query as the primary content category. A variety of types of information could be considered a nearest neighbor category for Microsoft as a primary category. For example, one of the secondary content categories 620 could be a category for corporate financial information. Such a category could be of interest to an investor. Another secondary content category 620 could be an employment category. Such a category could be of interest to either current or prospective employees. Still another secondary content category 620 could be a content category for the city of Redmond, where the company is located. For this latter category, additional content categories 630 could be available, such as lists of large employers in Redmond, housing market information for the surrounding area, or other types of information. Note that while FIG. 6 shows only a few content category nodes in the graph, an arbitrary number of nodes may be displayed. In other embodiments, additional context may be available for parsing a search query. For example, if additional context is available to indicate that the user is an investor, an additional secondary content category 620 can be made available that relates to other companies in the same industry. Alternatively, this additional secondary content category can be provided in place of the employment information node.

Preferably, for any content category nodes displayed in a graph, a user can select any node visible to immediately move to content items associated with the selected content category. By displaying both primary content categories directly related to a search, as well as secondary categories based in part on their relation to a primary category, a results display can be provided that allow a user to quickly move to a category of interest.

Selection of a content category node in a graph can have various effects. In an embodiment, selection of a content category node can lead to display of a new content category graph centered on the node, but without changing the search query. In such an embodiment, selecting a node can change what portions of the graph are visible to the user. In another embodiment, selecting a node can modify the search query to correspond to a query that matches the selected node. In such an embodiment, a new content category graph is displayed with the selected node as a primary content category. Secondary content categories are then selected based in part on the relationship to the primary content category. Optionally, additional context can also be used, either by explicitly retaining search terms from the prior search, or by using other context information about the user's interests. In embodiments where a content category graph is displayed along with other display objects, a selection of a content category node that modifies a search query can also generate a new group of content display objects and/or application display objects.

Figure 7:
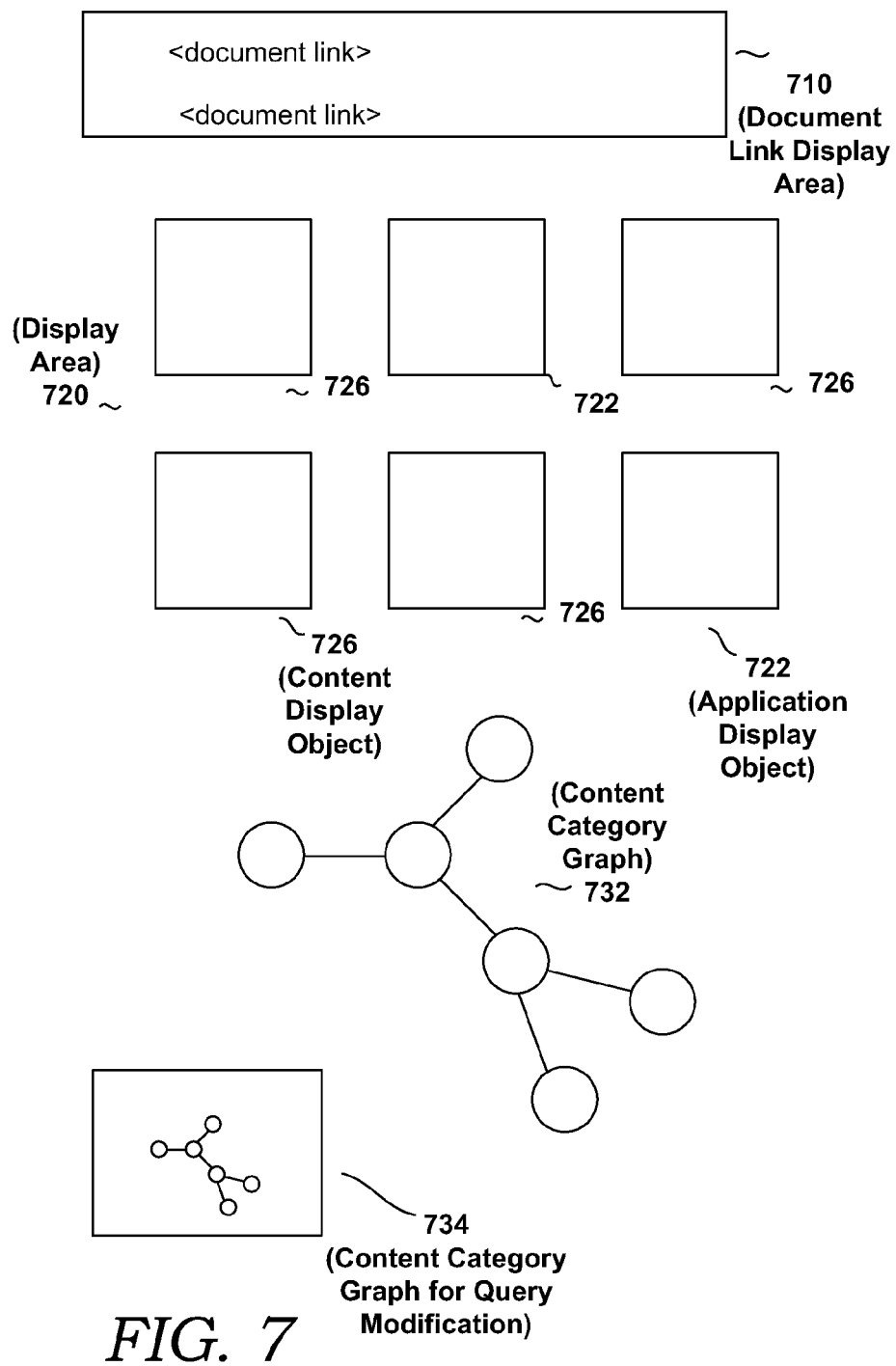
FIG. 7 schematically shows a display of results produced according to an embodiment of the invention.

FIG. 7 schematically shows an example of a results page combining various types of content items. In FIG. 7, a possible embodiment of a full semantic trading floor is shown. The various display areas include a display area for links to existing documents 710, a display area 720 for content display objects 726 and application display objects 722, and two separate display areas 732 and 734 for a content category graph. In the embodiment shown in FIG. 7, the larger of the content category graph area is a graph just for traversal of the graph nodes. Selection of a node in does not lead to modification of the search query, or modification of any other display area. Smaller content category graph 734 shows the same relationships as content category graph 732. However, selection of a node in content category graph 734 results in modification of the search query. Thus, a selection in content category graph 734 results in display of a new category graph, display of new content display units and application display units, and display of new links for existing documents. In other embodiments, any of the areas shown can optionally be omitted and/or replaced by still other types of results display areas.

Figure 8:
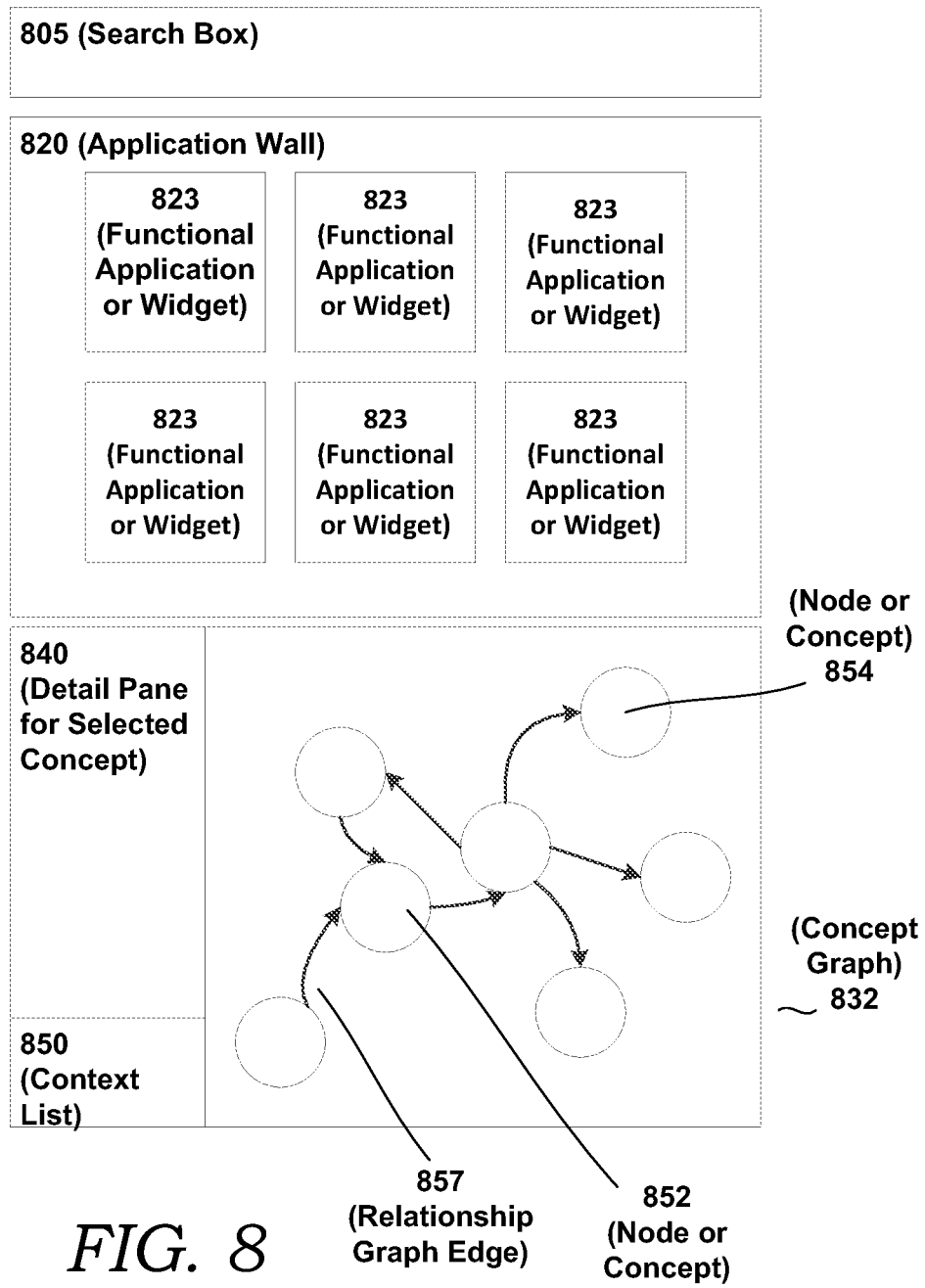
FIG. 8 schematically shows a display of results produced according to another embodiment of the invention.

FIG. 8 provides another example of a semantic trading desk (or floor) or knowledge wall according to an embodiment of the invention. In FIG. 8, area 805 represents a search box, such as a "traditional" search box. Search box 805 provides a way for a user to define a new and/or current intent. Note that a new or current user intent may be completely unrelated to the context being displayed in the application below. The user can provide their intent by any convenient method, such as via a keyword or set of keywords. The semantic trading desk can then respond by bringing up concepts that are matches or close matches for the entered keyword(s) and the user can begin exploring the information around that concept.

Area 820 provides an application wall. In the embodiment shown in FIG. 8, the application wall is a set of functional applications or widgets 823 that allow the user to launch experiences that are relevant to the current concept they are exploring. For example, one of the applications 823 may be a list of documents that are relevant to the currently selected concept, such as a listing of documents generated by a traditional search engine. As another example, if the selected concept is the price of stock shares in a company, an application may show the current stock price and stock trading volume for the company. In still another example, the application may offer a virtual tour of the Louvre featuring the Mona Lisa if the currently selected concept is related to Leonardo Da Vinci's art work. The widgets or functional applications 823 can include content display units and/or application display units.

Area 840 provides a detail pane for the selected concept. In the embodiment shown in FIG. 8, the detail pane 840 provides a general overview of the selected concept. In such an embodiment, the detail pane 840 can be a table of facts. The applications 823 can provide specialized views or experiences around the selected concept. By contrast, a detail pane can provide a convenient location for raw information. The facts that are displayed in the detail pane are specific to the current context. Such information can be useful, for example, for helping the user to decide whether or not the currently selected concept is in fact the concept they are interested in. Note that a concept, if displayed in different contexts, may have different lists of facts that show in this pane. For example, for a concept of a business with an employment context, the display pane 840 could include the total number of employees, a list of locations where the company has offices, and/or contact information for the human resources department. With the same business as the concept, but within a context of consumer goods, could provide a listing of the general categories of items sold by the business, a listing of retailers that carry goods made by the business, and/or notes about any government issued safety warnings for products made by the business.

Area 850 facilitates changing between contexts for a given concept. Each concept has one or more contexts that it applies to. For instance "Paris Hilton" is a concept that can be present in the "Celebrity" context as well as the "Heirs of America" context. Each context will have a different way of describing the selected concept. The selected context will drive the facts that show up in the detail pane 840 as well as the relationships and nodes that show up in the graph 832.

In the embodiment shown in FIG. 8, graph 832 represents concepts which are related to the user's current query. The user can navigate from one concept to another related concept and can explore the details in the detail pane 840 as concepts are navigated. The applications 823 displayed in area 820 will react to the currently selected concept and present a relevant experience for that concept instance. Each node 852 in the graph represents a concept instance. Selecting the concept node (or graph instance) will drive what is shown in the context list area 850, the detail pane 840, and the application wall 820. Each graph edge 857 in the graph can also represent a relationship. In embodiments where graph edges correspond to relationships, each relationship is also a concept. Thus, graph edges 857 can be selected in graph 832 in a manner similar to concepts 852. However, in the embodiment shown in FIG. 8, the selection of a graph edge 857 will not result in an update if the application wall 820 or context list 850. Instead, selection of graph edge 857 will only update detail pane 840 with a description of the selected relationship concept. In other embodiments, the selection of a graph edge 857 can result in updating of zero or more of the application wall 820, the context list 850, and the detail pane 840. Preferably, selection of a graph edge 857 will update at least one of the application wall 820, the context list 850, and the detail pane 840.

In FIG. 8, graph node 854 corresponds to an unselected node or concept. Each unselected node 854 represents a concept that is closely related to the currently selected concept. In the embodiment shown in FIG. 8, when an unselected or related node is selected, the concept represented by that node will become the currently selected concept. As described above, this will lead to corresponding changes in the application wall 820, context list 850, and display pane 840.

Figure 9:
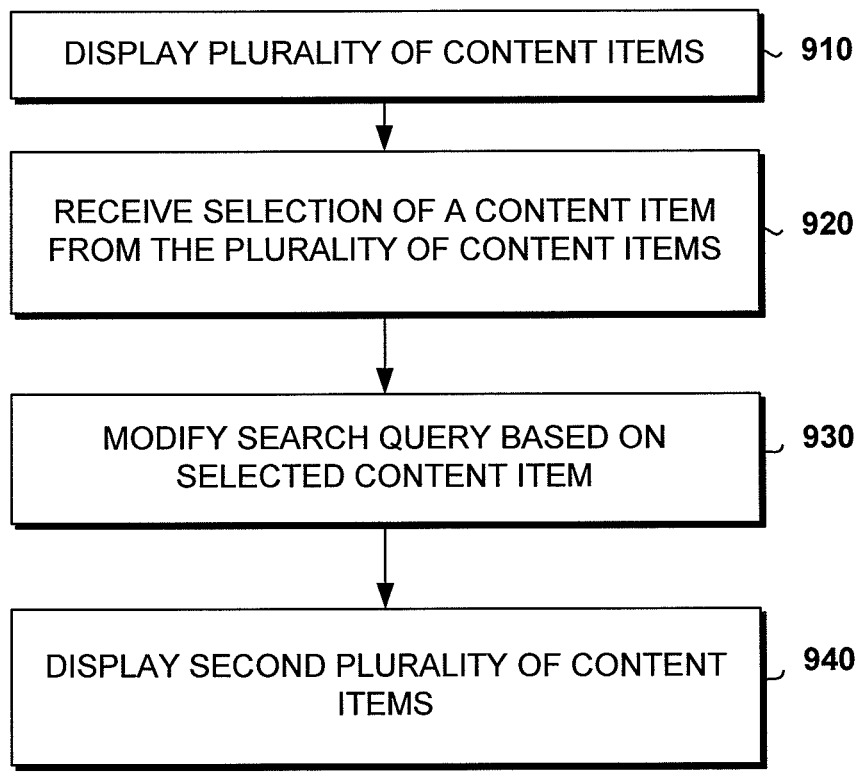
FIG. 9 depicts a flow chart of a method according to an embodiment of the invention.

FIG. 9 depicts a flow chart showing a method according to an embodiment of the invention. In FIG. 9, an initial display 910 of content items is provided. The initial display can be based on a search query explicitly provided by a user, based on a search query generated by tracking user behavior, or based on any other information that allows for appropriate content items to be selected for display and formation of a search query. A selection of a content item from the plurality of content items is then received 920. Based on the selected content item, the search query is modified 930. A second plurality of content items 940 is then displayed based on the modified search query. In various embodiments, the content items displayed as responsive to the initial search query can differ from the content items displayed based on the modified search query. For example, the content items based on the modified search query can include at least one primary content category that is different from the content categories associated with the initial search query. The content items based on the modified search query can also include at least one content display object that is different from the content display objects displayed as responsive to the initial search query.

Figure 10:
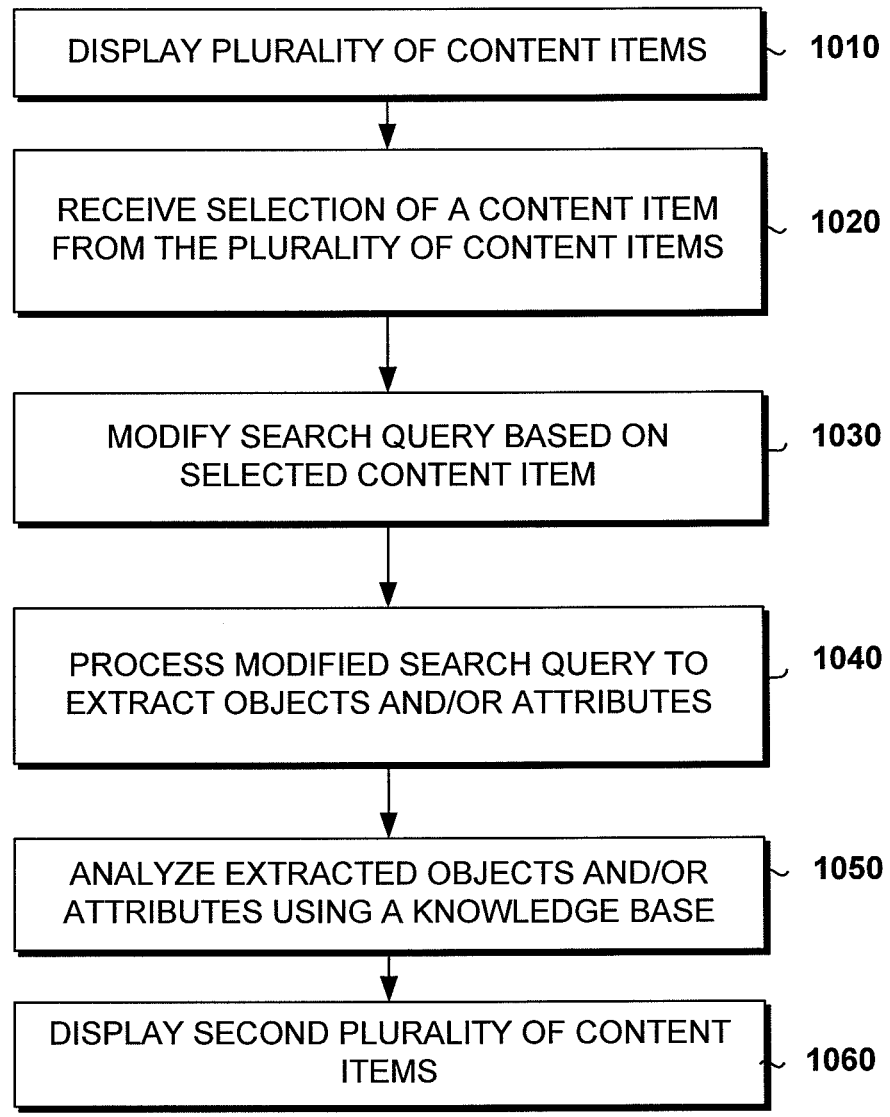
FIG. 10 depicts a flow chart of a method according to an embodiment of the invention.

FIG. 10 depicts a flow chart showing a method according to another embodiment of the invention. In FIG. 10, an initial display 1010 of content items is provided. The initial display can be based on a search query explicitly provided by a user, based on a search query generated by tracking user behavior, or based on any other information that allows for appropriate content items to be selected for display and formation of a search query. A selection of a content item from the plurality of content items is then received 1020. Based on the selected content item, the search query is modified 1030. The modified search query is then processed 1040 to extract one or more objects and/or attributes there from (e.g., utilizing the data processing component 240 of the data system architecture 200 of FIG. 2). Such processing may include, by way of example only, one or more of a lexical analysis, a linguistic analysis, and an entity extraction analysis. The objects and/or attributes from the modified search query are then analyzed 1050 utilizing at least one knowledge base (e.g., knowledge base 250 of the data system architecture 200 of FIG. 2) to determine knowledge content relevant to the one or more extracted objects and/or attributes of the received information request. As previously set forth, in embodiments, the knowledge base includes a knowledge content database (for instance, knowledge content database 254 of FIG. 2) including at least a content graph, a social graph, a user activity graph and temporal data relating to each of the content graph, the social graph, and the user activity graph. In embodiments, the data stored in association with the knowledge content database may be stored in a common, flexible storage schema, for instance, a star or snowflake schema. Additionally, in embodiments, the objects and/or attributes may be further analyzed using one or more of at least one ontology (e.g., stored in association with ontology/metadata database 252 of FIG. 2), at least one dimensional index (e.g., dimensional indexing sub-component 258 of FIG. 2) and at least one inferencing engine (e.g., inferencing engine 246 of FIG. 2). A second plurality of content items 1060 is then displayed based on the analyzed objects and/or attributes of the modified search query. In various embodiments, the content items displayed as responsive to the initial search query can differ from the content items displayed based on the modified search query. For example, the content items based on the modified search query can include at least one primary content category that is different from the content categories associated with the initial search query. The content items based on the modified search query can also include at least one content display object that is different from the content display objects displayed as responsive to the initial search query.

Additional Embodiments

In an embodiment, one or more computer-storage media storing computer-usable instructions are provided that, when executed by a computing device, perform a method for filtering search results. The method includes displaying a plurality of content items, the content items including one or more content display objects corresponding to a search query, one or more primary content category objects corresponding to the search query, and one or more secondary content category objects. A selection of a content item is then received. Based on the selected content item, the search query is then modified. A second plurality of content items is then displayed, including at least one second content display object corresponding to the modified search query that is different from the one or more content display objects, and at least one additional content category object different from the one or more primary content category object and one or more secondary content category objects.

In another embodiment, a method for filtering search results is provided. The method includes displaying a plurality of content items, the content items including one or more content display objects corresponding to a search query, one or more primary content category objects corresponding to the search query, and one or more secondary content category objects. A selection of a content item is then received. Based on the selected content item, the search query is then modified. The modified search query is then processed to extract one or more objects and/or attributes from the modified search query. The objects and/or attributes from the modified search query are analyzed utilizing a knowledge base to determine knowledge content relevant to the one or more extracted objects and/or attributes of the modified search query. A second plurality of content items is then displayed, including at least one second content display object corresponding to the modified search query that is different from the one or more content display objects, and at least one additional content category object different from the one or more primary content category object and one or more secondary content category objects In yet another embodiment, a system for displaying content is provided. The system includes a content retrieval manager capable of retrieving information for display in a content display object and identifying a format for information in the content display object. The system further includes a display object library for storing application display objects and content display objects. The system also includes a parser for matching application display objects, content display objects, and content categories to a search query. The system further includes a display manager for presenting at least one of content display objects, application display objects, and content categories.

Embodiments of the present invention have been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

What is claimed is:

1. A method for filtering search results comprising:
   displaying a plurality of content items, the content items including one or more content display objects corresponding to a search query, one or more primary content category objects corresponding to the search query, and one or more secondary content category objects;
   receiving a selection of a content item;
   modifying the search query based on the selected content item; and
   displaying a second plurality of content items, including at least one second content display object corresponding to the modified search query that is different from the one or more content display objects, and at least one additional content category object different from the one or more primary content category object and one or more secondary content category objects,
   wherein a content display object is associated with a plurality of formats for displaying information, the plurality of formats being associated with the content display object prior to receiving the search query, the plurality of formats associated with a content display object being based on content types of the information provided by the content display object;
   wherein the one or more content category objects and the one or more secondary category objects are displayed as nodes in a graph navigation display of content categories.

2. The method of claim 1, wherein the plurality of content items further comprises one or more application display objects.

3. The method of claim 1, wherein the selected content item is a content category object.

4. The method of claim 3, wherein the selected content category object is displayed as a primary content category object in the second plurality of content items.

5. The method of claim 1, wherein the category display objects and content category objects correspond to ontology-based categories.

6. The method of claim 1, wherein modifying the search query comprises adding a term to the search query based on the selected content item.

7. The method of claim 1, wherein modifying the search query comprises removing one or more terms from the search query.

8. The method of claim 1, wherein the method further comprises preparing the one or more content display objects after receiving the search query, the preparation of the content display objects comprising:
   obtaining information to be presented within the content display object;
   formatting the obtained information using at least one format or application selected from the plurality of formats or applications associated with the content display object;
   displaying the formatted information.

9. The method of claim 8, wherein formatting the obtained information comprises incorporating the information into an application for displaying the information.

10. The method of claim 1, wherein the selected content item is a content display object, the selection of the content display object and the modification of the search query comprising:
    receiving a selection of one of a plurality of content display objects;
    displaying a plurality of information levels corresponding to the selected content display object;
    receiving a selection of an information level within the selected content display object; and
    modifying the search query based on the selected information level.

11. The method of claim 10, wherein the selected information level is different than an information level displayed as part of the content display object prior to selection of the content display object.

12. A method for filtering search results, comprising:
displaying a plurality of content items, the content items including one or more content display objects corresponding to a search query, one or more primary content category objects corresponding to the search query, and one or more secondary content category objects;
receiving a selection of a content display object;
modifying the search query based on the selected content display object;
processing the modified search query to extract one or more objects or attributes from the modified search query;
analyzing the objects or attributes from the modified search query utilizing a knowledge base to determine knowledge content relevant to the one or more extracted objects or attributes of the modified search query; and
displaying a second plurality of content items, including at least one second content display object corresponding to the modified search query that is different from the one or more content display objects, and at least one additional content category object different from the one or more primary content category object and one or more secondary content category objects,
wherein a content display object is associated with a plurality of formats for displaying information, the plurality of formats being associated with the content display object prior to receiving the search query, the plurality of formats associated with a content display object being based on content types of the information provided by the content display object;
wherein the one or more content category objects and the one or more secondary category objects are displayed as nodes in a graph navigation display of content categories.

13. The method of claim 12, wherein the knowledge base includes a knowledge content database, and wherein the knowledge content database comprises at least a content graph, a social graph, a user activity graph, and temporal data relating to each of the content graph, the social graph and the user activity graph.

14. The method of claim 12, wherein analyzing the objects and/or attributes from the information request utilizing a knowledge base to determine knowledge content relevant to the one or more extracted objects or attributes of the received information request includes applying at least one ontology to the extracted objects and/or attributes.

15. A system for displaying content to a user, comprising:
a processor and associated memory containing computer executable instructions that when executed by the processor provide a system comprising:
a content retrieval manager for retrieving information for display in a content display object and identifying one or more formats associated with the content display object, the one or more formats being identified prior to retrieving the information;
a display object library for storing application display objects and content display objects;
a parser for matching application display objects, content display objects, and content categories to a search query; and
a display manager for presenting at least one of content display objects, application display objects, and content categories, wherein the display manager presents a content display object by formatting information retrieved by the content retrieval manager using at least one format identified as associated with the presented content display object, the at least one format being selected based on a content type of the retrieved information;
wherein the one or more content category objects and the one or more secondary category objects are displayed as nodes in a graph navigation display of content categories.

16. The system of claim 15, wherein the display manager presents content categories as nodes in a node network.

17. The system of claim 15, wherein the parser comprises an analyzer for extracting one or more objects or attributes from a search query.

18. The system of claim 15, wherein the display manager presents a results display including a plurality of content display objects, a plurality of application display objects, at least one content category node network, and a plurality of links to existing documents.

19. The system of claim 18, wherein the display manager further displays a plurality of content category node networks, including one content category node network with nodes that modify the search query upon selection of the node.

* * * * *